W. H. KEMPTON.
PROCESS AND APPARATUS FOR FORMING LAMINATED RODS AND TUBES.
APPLICATION FILED OCT. 8, 1918.
1,417,743.
Patented May 30, 1922.
2 SHEETS—SHEET 1.
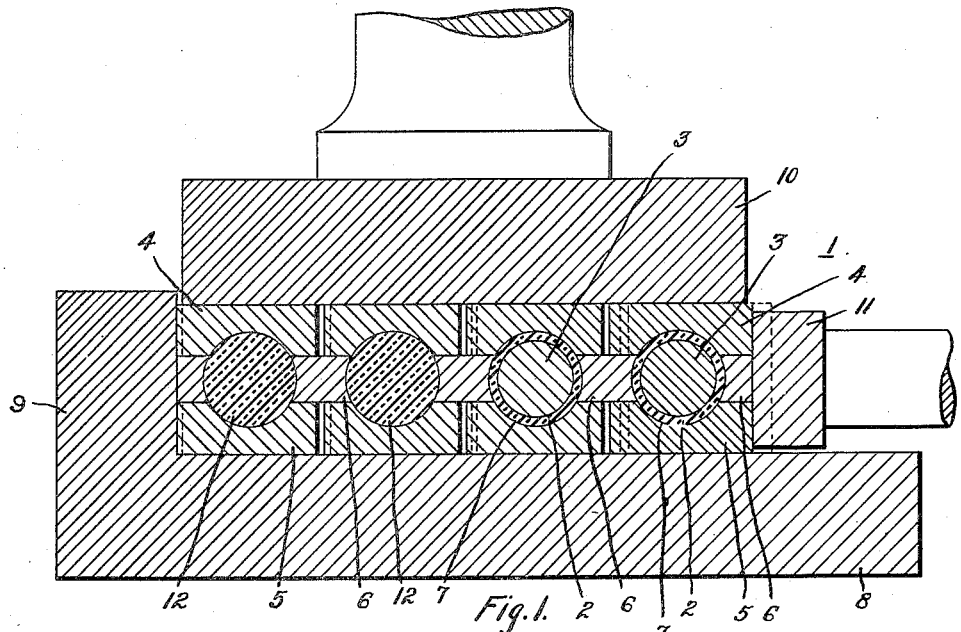
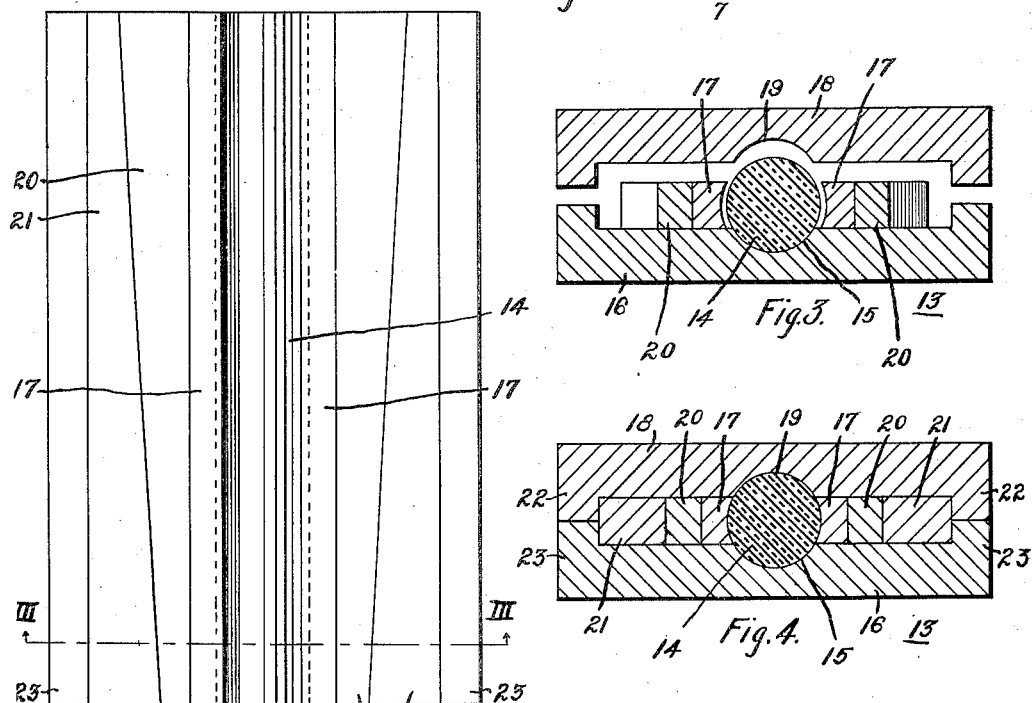
WITNESSES:
Ed. V. Herron
O. E. Bee.
INVENTOR
Willard H. Kempton
BY
Wesley G. Carr
ATTORNEY

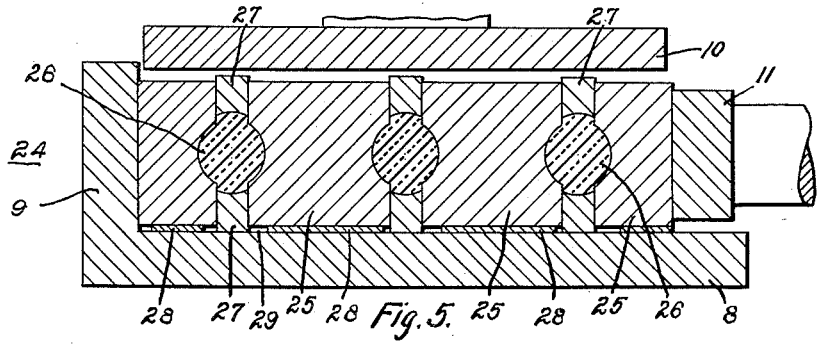
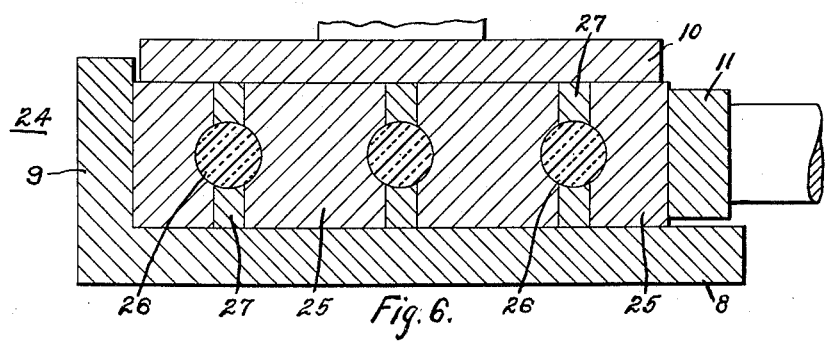
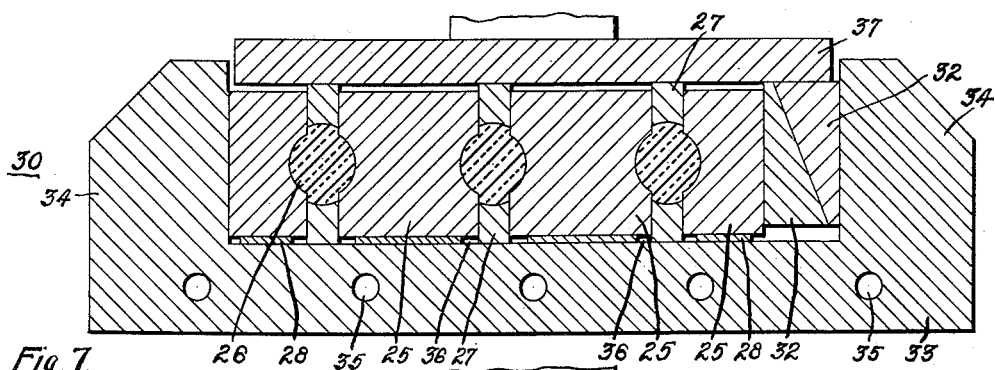
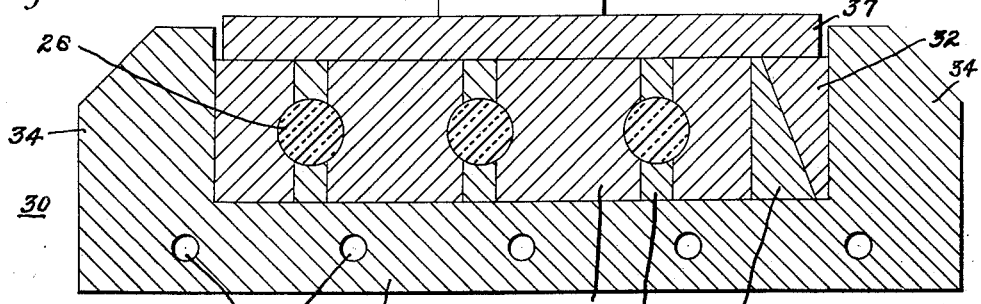

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

PROCESS AND APPARATUS FOR FORMING LAMINATED RODS AND TUBES.

1,417,743.      Specification of Letters Patent.      Patented May 30, 1922.

Application filed October 8, 1918. Serial No. 257,387.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Processes and Apparatus for Forming Laminated Rods and Tubes, of which the following is a specification.

My invention relates to molds and more particularly to molds for treating rods, tubes and the like comprising fibrous material impregnated with a binder. The primary object of my invention is to provide a mold for molding articles in such manner that a strong and uniform product may be produced.

One object of my invention is to construct a mold which may be employed in compressing and curing rods, tubes and the like composed of impregnated sheet material in such a manner that any possibility of pinching off the material of which the articles are formed shall be eliminated.

Another object of my invention is to provide a mold in which rods or tubes may be molded with equal facility and which will insure a uniform product in either case.

A further object of my invention is to construct a mold in which a plurality of rods or tubes or in which several of each of the articles named may be molded at the same time.

A still further object of my invention is to design a mold of such character that external pressure, which may be applied in two directions, will be transmitted uniformly in all directions to the articles being molded.

With these and other objects in view, my invention will be more fully described; illustrated in the drawings in which corresponding numerals indicate like parts, and then particularly pointed out in the appended claims.

In the drawings, Fig. 1 is a vertical, transverse sectional view of a mold embodying my invention, showing rods and tubes, also in section, enclosed therein; Fig. 2 is a plan view of a modified form of a mold embodying my invention, with the top of the mold removed; Fig. 3 is a sectional view taken on the line III—III of Fig. 2; Fig. 4 is a sectional view corresponding to the view shown in Fig. 3 with the several mold elements in their final positions; Fig. 5 is a vertical, transverse sectional view of a modified form of mold embodying my invention, showing rods, also in section, enclosed therein; Fig. 6 is a similar view of the mold shown in Fig. 5 but showing the mold elements in their final positions; Fig. 7 is a transverse sectional view of a mold, illustrating another modification of my invention and Fig. 8 is a transverse sectional view of the mold shown in Fig. 7, with the mold elements in their final positions.

In Fig. 1 is shown a mold 1 in which several articles may be molded at the same time. In this application of my invention, rods, tubes or the like may be molded by the same method. In molding tubes in a mold of this type the tubes 2 are preferably preformed by winding an impregnated sheet material about mandrels 3 and placing the mandrels and the material disposed about them between upper and lower splits or forming plates 4 and 5, and side splits or forming plates 6 are positioned between the upper and lower forming plates 4 and 5 in such manner that, when pressure is applied, the forming plates will establish closed cylindrical chambers 7 containing the tubes 2.

After the forming plates 4, 5 and 6 have been placed about the tubes 2, the structures, thus assembled, are disposed on a stationary or bottom press plate 8 which has a vertical or flanged portion 9 for resisting side pressure. A top pressure plate 10 may then be positioned upon the top forming plates 4 and full pressure applied thereto, thus bringing the top forming plates 4 adjacent the side forming plates 6. Moderate pressure is applied by a side pressure plate 11, in conjunction with the full pressure of the top pressure plate 10, until the top and bottom forming plates 4 and 5 are almost in engagement with the side forming plates 6, when the pressure is slightly relieved on the top pressure plate 10 and full pressure applied to the side pressure plate 11.

The pressure on the top pressure plate 10 is relieved slightly to permit movement of the assembled body beneath it and to allow compression from the side. The side pressure is continued until the assembled parts cannot be moved further and the pressure on the top pressure plate 10 is then fully applied. Heat may be applied while the several mold elements are being forced into their final positions by the pressure brought to bear upon them in this manner. The pressure plates may also serve as a medium for transferring heat to the mold elements. The pressures are maintained until the articles being molded are fully cured and cooled. The mold 1 may then be taken apart, and the tubes 2 removed, in the reverse order, with the exception that the pressures on both the top and the side may be completely removed in a single operation.

It should be noted that the pressure, which is applied to the end split exposed at one side of the mold, is transmitted through the articles being molded to the other side splits of the mold. This method of transmitting pressure permits the employment of several side splits having two grooved working surfaces for forming articles with which they may be brought into engagement.

Rods may be molded in the same manner as described for the tubes, there being no difference in the manner of assembling the mold elements about the rods or in the application of pressure. For this reason I have shown the rods 12, as well as the tubes 2, disposed in the mold 1. This mold may also be employed in treating one article at a time by selecting proper top and side pressure plates and employing a smaller number of forming plates.

A more compact mold for treating a single article, however, is shown in Fig. 2. This mold utilizes the same principle of forming the article and applying pressure thereto but is made more compact by employing a different form of pressure member. The pressure members in this case are wedges which are enclosed by two of the forming plates. In molding a rod 14 by employing this type of mold 13 the preformed rod 14 is placed in the longitudinal groove 15 of the lower forming plate 16, the side plates 17 are then positioned about the rod 14 and the top forming plate 18 are put in position so that its grooved surface 19 engages the rod 14. Pressure is then applied to the top forming plate 18 and subsequently to the bottom forming plate 16 and maintained while the wedge members 20 adjacent the side forming plates 17 are put in position and the wedge members 21, adjacent the flanges 22 and 23 of the top and bottom forming plates, are driven into position. The several members are maintained in this position until the assembled mold 13 has been cooled, heat having been previously applied to first soften and then to harden the binder with which the rod is impregnated. This latter form of mold is slower in operation than the former but it is also more compact and may be easily transferred from place to place.

The mold 24, shown in Fig. 5, differs from the mold 1, shown in Fig. 1, only in the disposition of the forming members or splits and the employment of spacer members. The forming members 25 correspond to the forming members 4 and 5 of the mold 1. These splits 25 are positioned on opposite sides of the rods 26, and the forming members or splits 27, which correspond to the splits 6, are disposed between the forming members 25, as in assembling the mold 1. The spacing members 28 are utilized to provide a surface upon which the forming members 25 may rest, in addition to reserving a space 29 into which the forming members 27, adjacent the supporting pressure plate 8, may project. The employment of the spacing members 28 permits an initial pressure being exerted on the end forming member 25 by the side pressure plate 11 and the subsequent movement of all the forming members 25 before pressure is applied to the splits 27 to complete the compression of the rods 26.

The spacing members 28 may be removed after the compression, resulting from the pressure exerted by the pressure member 11, is sufficient, and pressure may then be applied to the forming members 27 by the pressure plate 10.

The disposition of the several forming members, as shown in Fig. 5 and described above, is advantageous because the final pressure, which is the more difficult to apply on account of the frictional resistance, may be exerted directly, not being transmitted through the rods. Furthermore, the final compression of the rods may be obtained by employing a vertical pressure.

The mold 30 shown in Fig. 7 illustrates another application of my invention. The manner of assembling the forming members about the article to be molded is the same as described for the mold 24 shown in Fig. 5. The advantageous feature in this case is the manner of applying the pressure. Only one pressure plate 31 is necessary in conjunction with the wedge members 32. The employment of the wedge members 32 necessitates the use of a supporting member 33 having flange portions 34 between which the mold elements may be disposed. Heat may be applied by means of steam passages 35 formed in the supporting member 33.

The preformed rods 26 may be surrounded by the forming members 25 and 27, as previously described, and the body thus assembled may be placed between the flange portions 34 of the supporting member 33, the spacing members 28 being disposed between the forming members 25 and the supporting member 33 in such manner that a space 36 is provided into which the lower forming members 27 may project. The wedge members 32 may be positioned between one of the splits 25 and one of the flange portions 34 so that pressure applied to the pressure plate 37 will be transmitted through the wedges 32 to the forming members 25 and rods 26.

The wedges 32 are forced down between the forming member 25 and the flange portion 34 until the pressure plate 37 engages the forming members 27. The spacing members 28 may then be removed and further pressure exerted to force the splits 27 into their final positions, as shown in Fig. 8.

Although I have described several forms of molds embodying my invention in which the same principle is involved, it will be obvious that other changes may be made in constructing the mold without departing from the spirit of my invention and I desire, therefore, that no limitations shall be imposed except such as are indicated in the appended claims.

I claim as my invention:

1. A mold for rods, tubes and the like comprising means for partially compressing a body to be molded, and means for limiting such compression, such limiting means being subsequently movable to complete the compression.

2. A mold for rods, tubes and the like comprising opposed forming members and additional forming members movable into engagement with the first to provide a closed chamber and to partially compress a body contained therein, the first members being finally movable to constrict the chamber and complete the compression of the body therein.

3. A mold for rods, tubes and the like comprising forming members movable to compress a body between them through engagement against its opposite sides, and additional forming members disposed between the first mentioned forming members and engaged by them when the members are in coactive position, the additional forming members being movable to further compress the body by engagement against those portions of the body not engaged by the first mentioned forming members.

4. A mold for rods, tubes and the like comprising movable forming members coacting to establish a cylindrical opening and compress a body surrounded by them, and means for applying pressure to the forming members, said means including movable pressure members and a stationary supporting member.

5. A mold for rods, tubes and the like comprising movable forming members coacting to establish a cylindrical opening and compress a body surrounded by them, and means for applying pressure to the forming members, said means including two movable pressure members and a stationary supporting member.

6. A mold for rods, tubes and the like comprising movable forming members coacting to establish a cylindrical opening and compress a body surrounded by them, and means for applying pressure to the forming members, said means including two movable pressure members and a stationary L shaped supporting member.

7. A mold for rods, tubes and the like comprising enclosing forming members adapted to engage a body disposed between them, additional opposed forming members adapted to engage those portions of the body not engaged by the enclosing forming members, and means for exerting pressure against the last mentioned forming members.

8. A mold for rods, tubes and the like comprising enclosing forming members adapted to engage a body disposed between them, additional forming members adapted to engage those portions of the body not engaged by the enclosing forming members, and wedge members coacting with the enclosing forming members to exert a pressure against the additional forming members.

9. A mold comprising two pair of splits having longitudinally grooved working faces, the grooved faces of the two pair of splits forming a cylindrical opening when the splits are forced into engagement with each other, top and side pressure plates adapted to transmit pressure to the splits, and a pressure plate suitably shaped to serve as a support for the splits when pressure is applied by means of the top and side pressure plates.

10. A mold for rods, tubes and the like comprising two pair of splits having longitudinally grooved working faces, the grooved faces of the two pair of splits forming a cylindrical opening when the splits are forced into engagement with each other, a pressure plate suitably shaped to serve as a support for the splits, spacing elements adapted to be positioned between certain of the splits and the supporting pressure plate, and a top and a side pressure plate adapted to transmit pressure to the splits engaged by them.

11. A mold for rods, tubes and the like comprising two pair of splits having longitudinally grooved working faces, the grooved faces of the two pair of splits forming a cylindrical opening when they are forced into engagement with each other, a substantially U-shaped supporting member, means for heating the supporting member, spacing elements adapted to be positioned between the U-shaped supporting member and certain of the splits, wedge members coacting with the supporting member to transmit pressure to the splits, and a pressure plate adapted to transmit pressure to the wedge members and certain of the splits.

12. The process of molding which comprises partly molding a body by pressure applied in one direction and completing the molding by pressure applied in another direction.

In testimony whereof, I have hereunto subscribed my name this 25th day of Sept. 1918.

WILLARD H. KEMPTON.